United States Patent
Price et al.

(10) Patent No.: US 9,396,546 B2
(45) Date of Patent: Jul. 19, 2016

(54) LABELING OBJECTS IN IMAGE SCENES

(71) Applicant: Adobe Systems Incorporated, San Jose, CA (US)

(72) Inventors: Brian L. Price, San Jose, CA (US); Scott Cohen, Sunnyvale, CA (US); Jimei Yang, Merced, CA (US)

(73) Assignee: Adobe Systems Incorporated, San Jose, CA (US)

( * ) Notice: Subject to any disclaimer, the term of this patent is extended or adjusted under 35 U.S.C. 154(b) by 39 days.

(21) Appl. No.: 14/159,658

(22) Filed: Jan. 21, 2014

(65) Prior Publication Data

US 2015/0206315 A1    Jul. 23, 2015

(51) Int. Cl.
  *G06K 9/00*    (2006.01)
  *G06T 7/00*    (2006.01)

(52) U.S. Cl.
  CPC .............. *G06T 7/0081* (2013.01); *G06T 7/0087* (2013.01); *G06T 7/0093* (2013.01); *G06T 2207/10024* (2013.01); *G06T 2207/20016* (2013.01); *G06T 2207/20081* (2013.01)

(58) Field of Classification Search
  None
  See application file for complete search history.

(56) References Cited

U.S. PATENT DOCUMENTS

| | | | | |
|---|---|---|---|---|
| 2004/0175037 | A1* | 9/2004 | Guleryuz | G06K 9/00456 382/180 |
| 2010/0322525 | A1* | 12/2010 | Kohli | G06K 9/6297 382/226 |
| 2012/0086850 | A1* | 4/2012 | Irani | G06T 3/4053 348/441 |
| 2012/0269436 | A1* | 10/2012 | Mensink et al. | 382/180 |
| 2012/0294514 | A1* | 11/2012 | Saunders et al. | 382/159 |
| 2014/0037198 | A1* | 2/2014 | Larlus-Larrondo et al. | 382/159 |

* cited by examiner

*Primary Examiner* — Hadi Akhavannik
(74) *Attorney, Agent, or Firm* — Kilpatrick Townsend & Stockton LLP

(57) ABSTRACT

Disclosed are various embodiments labeling objects using multi-scale partitioning, rare class expansion, and/or spatial context techniques. An input image may be partitioned using different scale values to produce a different set of superpixels for each of the different scale values. Potential object labels for superpixels in each different set of superpixels of the input image may be assessed by comparing descriptors of the superpixels in each different set of superpixels of the input image with descriptors of reference superpixels in labeled reference images. An object label may then be assigned for a pixel of the input image based at least in part on the assessing of the potential object labels.

20 Claims, 11 Drawing Sheets

LABELING OBJECTS IN IMAGE SCENES

FIELD

This application relates to classifying and labeling objects in image scenes and more specifically relates to classifying and labeling objects in an image based on reference objects classified or labeled in reference images.

BACKGROUND

The primary goal of existing scene parsing techniques is to associate a class/label such as "sky," "tree," "dog," etc. with each pixel in a still image. Labels, which may also be referred to as classes herein, are useful in assigning keywords to images, categorizing images, organizing images, and a variety of other purposes. The ability to automatically parse image scenes to assign labels to particular portions of an image can greatly reduce user effort in image editing and organization. Existing techniques for automatic scene parsing often fail to accurately classify or label interesting objects for various reasons. For example, rare objects, such as boats and people, are often not identified accurately.

SUMMARY

One exemplary and non-limiting embodiment involves labeling objects using multi-scale superpixel sets. For example, this may involve partitioning an input image using different scale values to produce a different set of superpixels for each of the different scale values, each of the superpixels comprising a plurality of pixels of the input image. The exemplary embodiment further involves assessing potential object labels for superpixels in each different set of superpixels of the input image. This may involve comparing descriptors of the superpixels in each different set of superpixels of the input image with descriptors of reference superpixels in labeled reference images, the reference superpixels being associated with respective object labels. The exemplary embodiment may further involve assigning an object label for a pixel of the input image based at least in part on the assessing of the potential object labels.

Another exemplary and non-limiting embodiment involves labeling objects based on expansion of reference data regarding rare classes. This may involve identifying labeled reference images similar to an input image in an image dataset, where reference superpixels in each of the labeled reference images are associated with object labels. This exemplary embodiment may further involve determining rare object labels based on a label, distribution of the object labels in the image dataset and supplementing the identified labeled reference images to increase reference superpixels with the rare object labels. The exemplary embodiment may further involve partitioning the input image into superpixels, each of the superpixels of the input image comprising multiple pixels of the input image. The exemplary embodiment may further involve assessing potential object labels for the superpixels of the input image by comparing descriptors of the superpixels of the input image with descriptors of reference superpixels in the identified labeled reference images and assigning an object label for a pixel of the input image based at least in part on the assessing of the potential object labels.

Another exemplary and non-limiting embodiment involves labeling objects using spatial context information. This may involve, for example, partitioning an input image into superpixels, each of the superpixels comprising multiple pixels of the input image. The exemplary embodiment may further involve scoring a potential object label for a superpixel of the superpixels by comparing a descriptor of the superpixel with descriptors of reference superpixels in labeled reference images, the reference superpixels being associated with the potential object label. The score may be based at least in part on a spatial context of an adjacent superpixel of the input image. The exemplary embodiment may further involve assigning the object label for a pixel of the input image based at least in part on the scoring of the potential object label.

These embodiments are described herein to exemplify but not limit certain aspects of this patent. Additional and alternative embodiments will be apparent in light of the additional information provided herein.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same.

Figure 1:
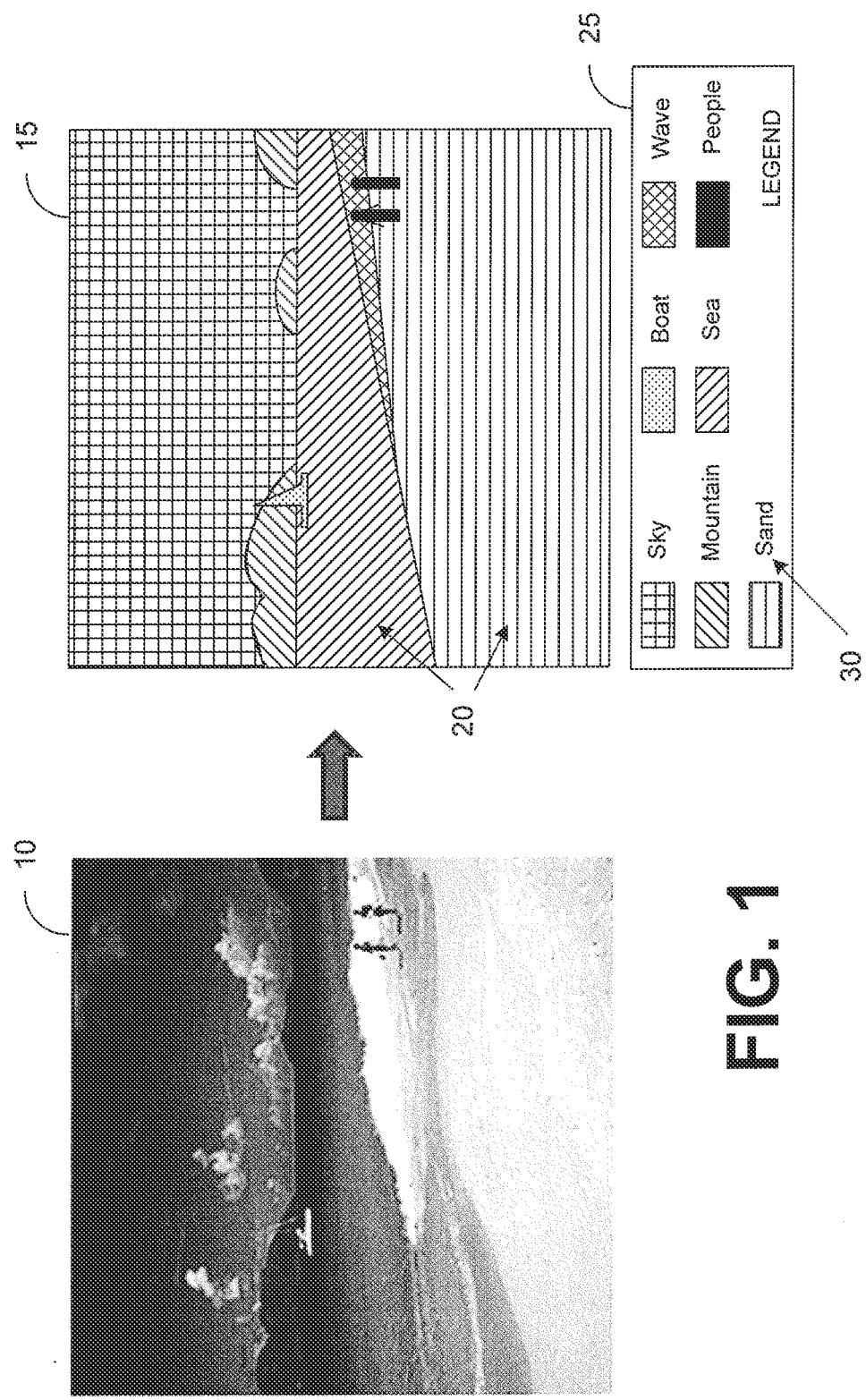
FIG. 1 is a illustrative example of a visualization of a pixel map that may be produced by an object identification service executed in a server device according to various embodiments of the present disclosure.

With reference to FIG. 1, shown is an illustrative example of a result of the operations that may be performed on an input image 10 by an object identification service. The object identification service may examine the input image 10 to produce a pixel map that identifies some or all of the pixels of the input image as part of one or more objects. The pixel map of this example may be visualized as an image map 15 where the pixels of the input image 10 are grouped into regions of superpixels 20. Each of the superpixels 20 represent pixels of the input image 10 that have been identified and classified as a particular type of object, which may be referred to as the object label 30 for a given superpixel region.

With regard to displaying the image map 15 on an interface, such as an interface used through an image editing application, the various object labels 30 for the input image 10 may be collected and displayed as a legend 25. The legend 25 may be useful to, for example, permit a viewer of the image map 15 to visualize the regions of the input image 10 and the object labels 30 associated with these regions.

Labeling of objects of an image can be accomplished using already-labeled reference images. Labeled reference images can be any images that have some or all of their pixels previously associated with one or more labels. Based on a given input image, i.e., an image for which labels are to be assigned, a set of reference images that are already associated with labels can be selected. For example, the set of reference images may be selected automatically using an algorithm, that assesses the similarity of the input image to multiple images in a repository of reference images. The images in the repository that are most similar to the input image can be selected for use as reference images in labeling the input image.

The labeled images can be used to label portions of the input image in various ways. The input image can be segmented into multiple multi-pixel portions, i.e., superpixels, and appropriate labels determined for each of those superpixels by identifying labeled superpixels in the reference images that best match each superpixel in the input image. Each pixel in the input image can then be labeled based on the label identified for its associated superpixel. Consider the following specific example to generally introduce superpixel matching. If an input image is portioned into 100 superpixels, a comparison can be performed to identify that a first superpixel in the input image is similar to 10 superpixels in 10 reference images that are all labeled "boat." These comparisons can be used in determining that an appropriate label for the first superpixel in the input image is "boat" and all of the pixels in that first superpixel can be assigned the "boat" label. Similar comparisons can be performed to label the remaining 99 superpixels of the input image, to provide a pixel map that provides a label for every pixel of the input image.

In the labeling of pixels of an input image, the labeled reference images can be used to determine the relative propriety of potential labels for a particular input image superpixel. In the above example, the first superpixel may be determined to be similar to superpixels in 10 reference images that are all labeled "boat" and also to be similar to superpixels in 5 reference images that are all labeled "car." Based on a determination that the input image superpixel is more similar to the "boat" reference image superpixels than to the "car" reference image superpixels, "boat" can be determined to be a more appropriate label for the input image superpixel. In one embodiment, a given input image superpixel can be compared with some or all of the labeled superpixels in a set of labeled reference images to determine values that represent the similarity of the input image superpixel to superpixels of labeled reference images. Thereby a value is determined for each label ("boat," "car," "bus," train," "house," "skyscraper," etc.) that represents how well each of the respective labels represents the input image superpixel. Such values can be represented in a vector or in any other form and ultimately provide information useful in selecting (automatically or otherwise) an appropriate label for the input image superpixel.

The general techniques of using labeled reference images to determine labels for pixels of an input image can be enhanced using one or more features. One embodiment disclosed herein uses multi-scale superpixel sets such that each superpixel in the input image is associated with multiple superpixels, where each of the superpixels is associated with a potential label. A best label is selected for the input image pixel from those-multiple potential labels. For example, a first superpixel set may comprise an input image broken into 10 relatively large superpixels and a second superpixel set may comprise the same image broken into 100 relatively small superpixels. Thus each pixel in the image is associated with a relatively large superpixel and a relatively small superpixel. Proposed labels can be determined for each of the relatively large superpixel and the relatively small superpixel and a label for the individual can be determined, for example, by picking between the best label from amongst the potential labels identified from both sets.

Figure 2:
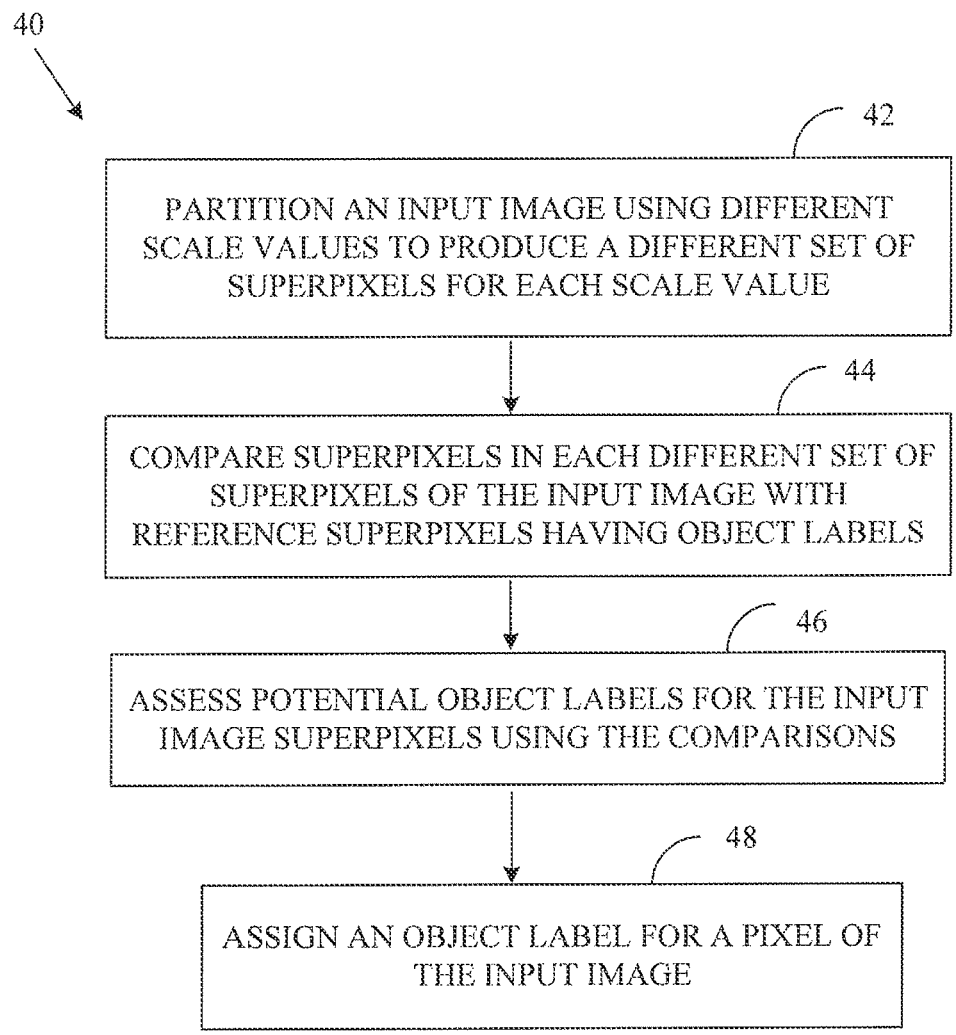
FIG. 2 illustrates a flow chart of an exemplary method of labeling objects using multi-scale superpixel sets.

FIG. 2 illustrates a flow chart of an exemplary method 200 of labeling objects using multi-scale superpixel sets. The exemplary and non-limiting method 200 could be carried out by any suitable computing device or system, for example, via an object identification service 201 on a server device 52 shown in FIG. 3 and discussed below.

The method 200 begins by partitioning an input image using different scale values to produce a different set of superpixels for each of the different scale values, each of the superpixels comprising a plurality of pixels of the input image, as shown in block 42. For example, one set of superpixels may have 10 superpixels, another set of superpixels may have 25 superpixels, another set of superpixels may have 50 superpixels, etc. The sets of superpixels may thus differ with respect to one another with respect to scale. The one or more algorithms used to partition the image can utilize a scale parameter that allows the number of resulting superpixels in the set (and their corresponding average sizes) to be controlled. The result of partitioning an input image using different scale values to produce a different set of superpixels for each of the different scale values is to produce, for each pixel of the input image, multiple associated superpixels (i.e., one in each of the sets).

The method 200 further involves comparing superpixels in each different set of superpixels of the input image with reference superpixels, as shown in block 44. Such reference superpixels may be from reference superpixels and may be associated with respective object labels. The comparison may involve comparing descriptors of the superpixels in each different set of superpixels of the input image with descriptors of reference superpixels in labeled reference images.

The method 200 further involves assessing potential object labels for superpixels in each different set of superpixels of the input image using the comparisons, as shown in block 46, and assigning an object label for a pixel of the input image, as shown in block 48. Assigning the label may be based at least in part on the assessing of the potential object labels. For example, labels may be scored for each of the associated superpixels (i.e., superpixels in the sets corresponding to the location of the pixel in the input image) where the scores represent the similarities of labeled superpixels to the respective superpixel. Such label scores can be used to select an appropriate label for the pixel. When this technique is carried out for multiple (or all) of the pixels of the input image, the labeling of any given pixel is improved based on the use of the multi-scale superpixel sets because each pixel is labeled based on the most appropriate scale, e.g., the superpixel size that best matched the reference image superpixels. Moreover, different pixels may have labels that are determined with reference to differently scaled superpixels. As a specific example, a large superpixel may be used to identify an appropriate "ocean" label for all of the pixels a relatively large portion of an image based on a corresponding strong match with one or more large superpixels labeled "ocean" in the reference images. In the same labeling process, a smaller superpixel (from a differently scaled superpixel set) may be used to identify an appropriate "person" label for pixels in a relatively small portion of an image based on a corresponding strong match with one or more small superpixels labeled "person" in the reference images.

These exemplary and non-limiting examples were provided to introduce the general subject matter of certain aspects of this patent. Additional embodiments are discussed herein to present additional embodiments and features. Moreover, alternatives, variations, and additional aspects will be apparent to those of skill in the art.

Figure 3:
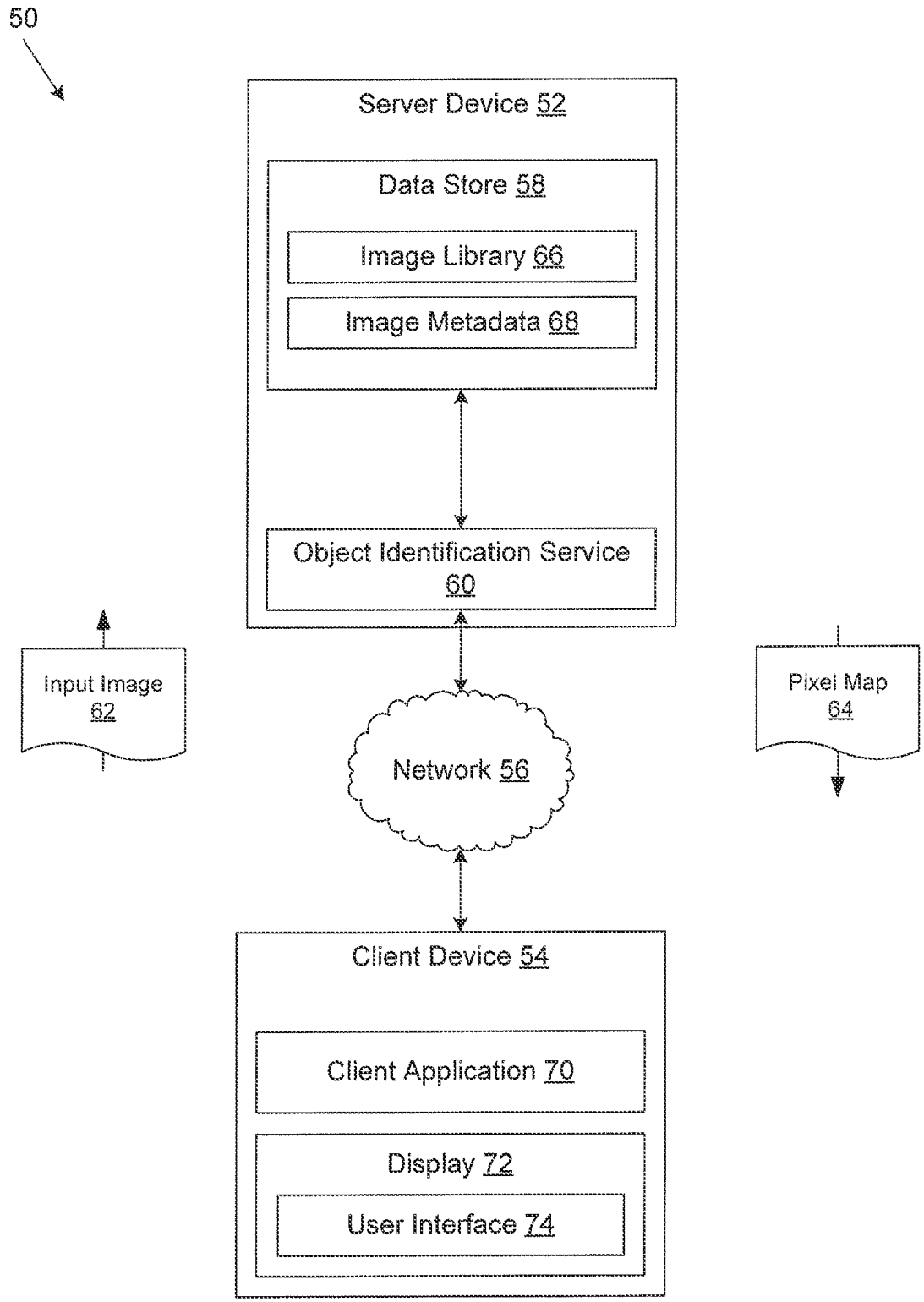
FIG. 3 is a drawing of a networked environment according to various embodiments of the present disclosure.

FIG. 3 is a drawing of a networked environment 50 according to various embodiments. The networked environment 50 includes a server device 52 and a client device 54, which are in data communication with each other via a network 56.

The components executed on the server device 52, for example, include an object identification service 60, and other applications, services, processes, systems, engines, or functionality not discussed in detail herein. The object identification service 60 is executed to obtain an input image 62 from which a pixel map 64 is produced for the input image 62. The input image 62 may represent a digital image encoded in various possible formats such as graphic interchange format (GIF), joint photographic expert group (PEG), portable network graphics (PNG), bitmap, etc. The pixel map 64 may identify some or all of the pixels of the input image 62 as part of one or more types of objects (i.e. "object labels") identified as "present" within the rendered input image 62.

The data stored in the data store 58 includes, for example, an image library 66, image metadata 68, and potentially other data. The image library 66 may comprise a plurality of digital images or portions of digital images that may be used as a basis for comparison with the input image 62. The digital images of the image library 66 may be referred to as "reference images" and may be encoded in various possible formats such as GIF, JPEG, PNG, bitmap, etc. The image metadata 68 may comprise various metadata about the reference images such as pixel maps, object label adjacencies for the pixels, descriptive keywords or tags, image capture data, and/or other possible metadata as can be appreciated.

The client device 54 is representative of a plurality of client devices that may be coupled to the network 56. The client device 54 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 54 may include a display 72. The display 72 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 54 may be configured to execute various applications such as a client application 70 and/or other applications. The client application 70 may be executed in a client device 54, for example, to provide content to and/or obtain content from the server device 52 and/or other servers, thereby rendering a user interface 74 on the display 72. To this end, the client application 70 may comprise, for example, a browser, a dedicated application, etc., and the user interface 74 may comprise a network page, an application screen, etc. The client device 54 may be configured to execute applications beyond the client application 70 such as, for example, email applications, social networking applications, word processors, spreadsheets, and/or other applications. The client device 54 may provide an image editing application or provide access to a cloud-based image editing application, that may be provided as a software as a service application.

The object identification service 60 may obtain an input image 62 from client device 54 or from any other source. In some embodiments, the client device 54 may provide the input image 62 to the object identification service 60 via the network 56 using hypertext transfer protocol (HTTP), HTTP secure (HTTPS), remote procedure call (RPC), user datagram protocol (UDP), transmission control protocol (TCP), Internet protocol (IP), and/or other network protocols as can be appreciated. In other embodiments, the object identification service 60 retrieves the input image 62 via the data store 58 or from another computing device accessible via the network 56.

The input image 62 may be partitioned into regions of superpixels by the object identification service 60, where the partitioning may be performed using a graph-based algorithm. Although the goal is to assign semantic labels to pixels, single pixels usually do not contain much semantic information. Thus, it may be advantageous to choose to recognize pixels in their proper neighborhood regions, superpixels. A graph-based algorithm may be used for superpixel segmentation.

In some embodiments, the object identification service 60 may partition the input image 62 into a plurality of sets of superpixels, where each set is captured at a different scale of observation, or "scale value," for the graph-based algorithm. Segmenting the input image in multiple scales allows discovery of better semantic regions. By adjusting the scale value, the preference for different superpixel region sizes is also adjusted such that a larger scale value indicates a preference in the graph-based algorithm for larger superpixel regions. A fast graph-based segmentation algorithm may be used for producing the plurality of superpixel regions. In one embodiment, an input image is segmented using four k values, k=50, 100, 200, 400 in the graph-based algorithm. The smaller k means fine-scale segmentation while the larger k means coarse-scale segmentation.

Figure 4:
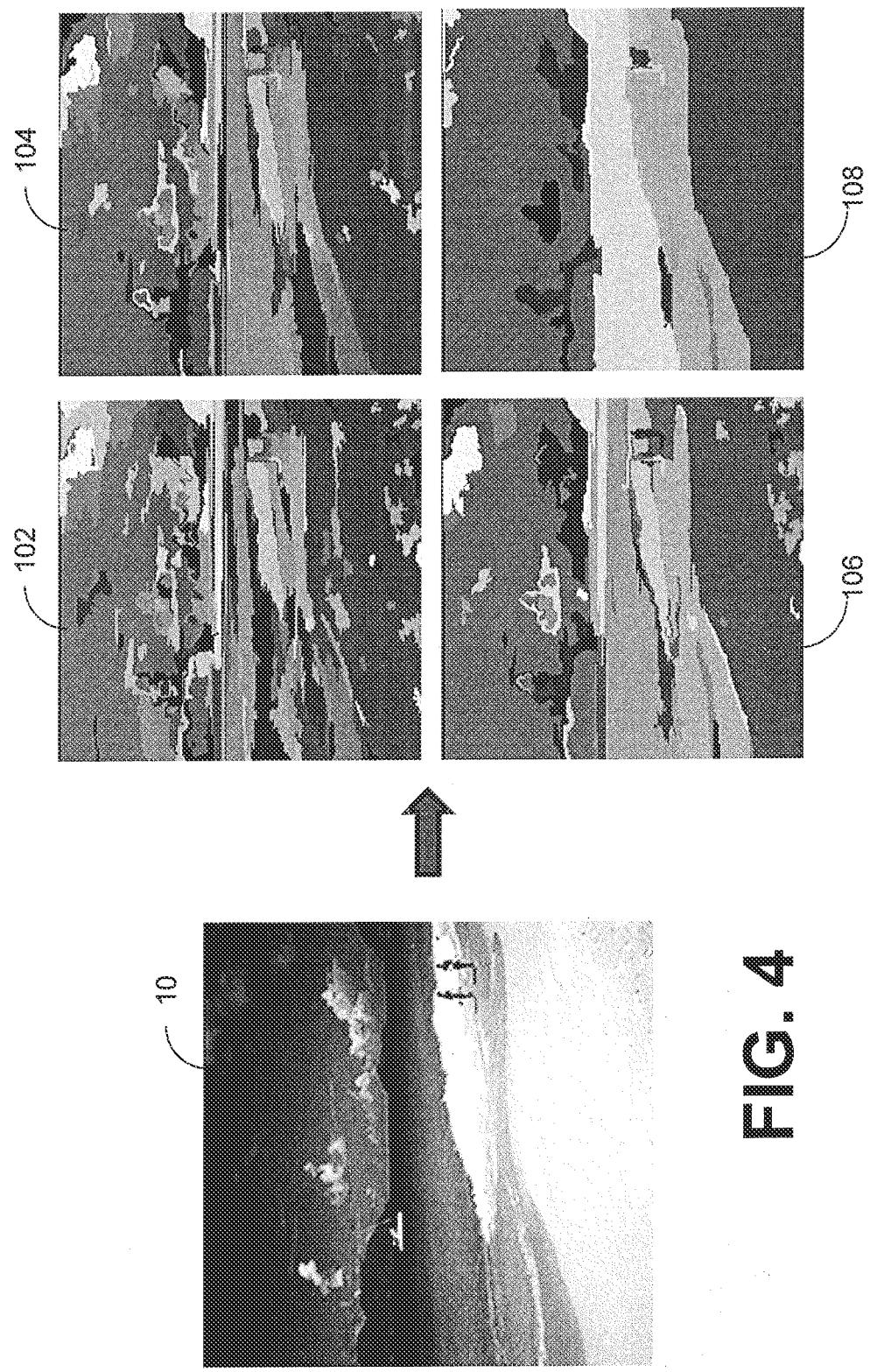
FIG. 4 illustrates how an input image can be partitioned at different scales.
Figure 5:
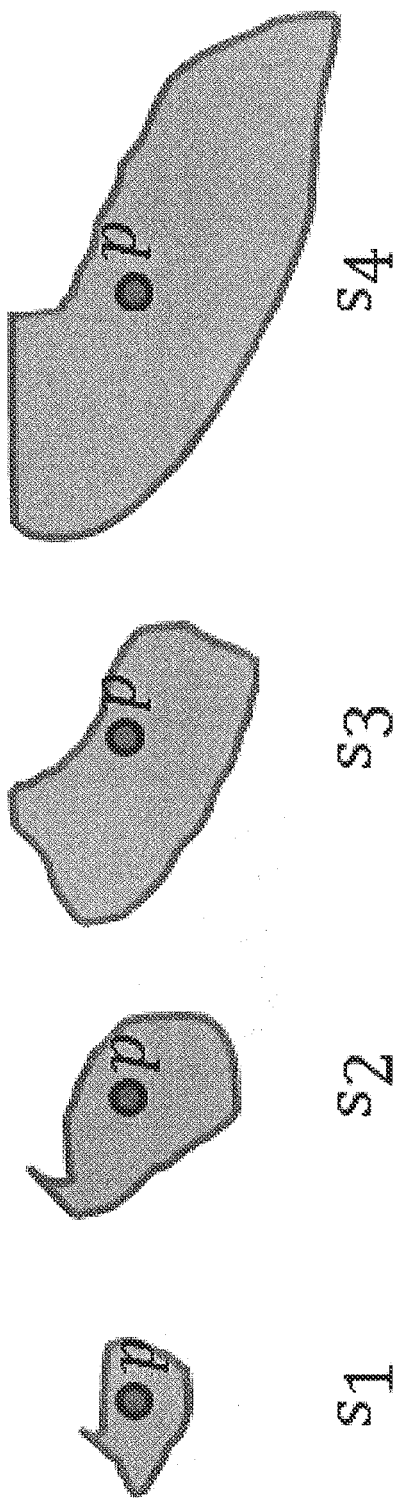
FIG. 5 illustrates how a pixel can be associated with superpixels from four different superpixel sets partitioned from an input image at different scales.

FIG. 4 illustrates how an input image 10 can be partitioned at different scales. This example uses four k values, k=50, 100, 200, 400 in the graph-based algorithm to provide: a very fine grained superpixel image 102, a fine grained superpixel image 104, a course superpixel image 106, and a very course superpixel image 108. FIG. 5 illustrates how a pixel p can be associated with superpixels from four different superpixel sets s1, s2, s3, s4, partitioned from an input image at different scales.

Whether from a single set or multiple sets of superpixels, the superpixels from the input image can be compared with superpixels from reference images to identify appropriate labels. The selection of reference images can improve the accuracy and efficiency of the process. In some embodiments, the object identification service 60 may select particular reference images from a large number of potential reference images in an image library 66. It may be desirable to select a subset of less than all of the available images and use only the most relevant reference images for various reasons including, but not limited to, improving labeling accuracy and reducing processing time. For example, one embodiment employs a selection algorithm to select reference images that have a similar spatial layout as the input image 62. The reference images may be identified using various possible image similarity techniques such as Bag-of-Words, etc. resulting in reference images that typically have a similar spatial layout as the input image 62. In addition, the image metadata 68 for the reference images may be obtained and may provide labels for the reference images.

Figure 6:
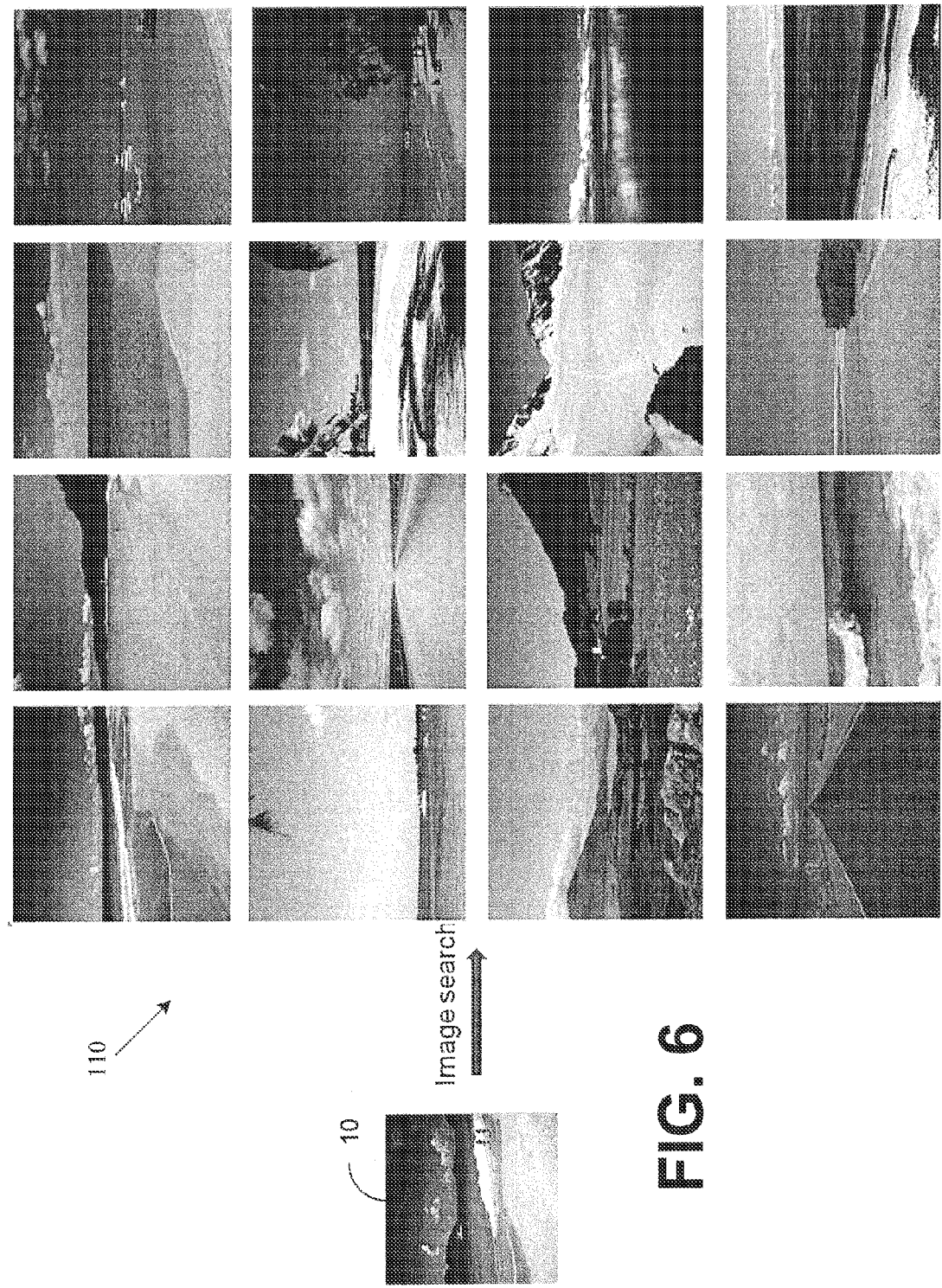
FIG. 6 illustrates how results of a search for reference images similar to an input image can have a similar spatial layout as the input image.

FIG. 6 illustrates how results 110 of a search for reference images similar to the input image 10 can have a similar spatial layout as the input image 10. Although 16 reference images are depicted in FIG. 6 for illustrative purposes, a result set will typically, but not necessarily, have more images to improve the accuracy of the labeling processes. Each of the reference images may include one or more labeled features, i.e., superpixels that were previously labeled manually or automatically.

Figure 7:
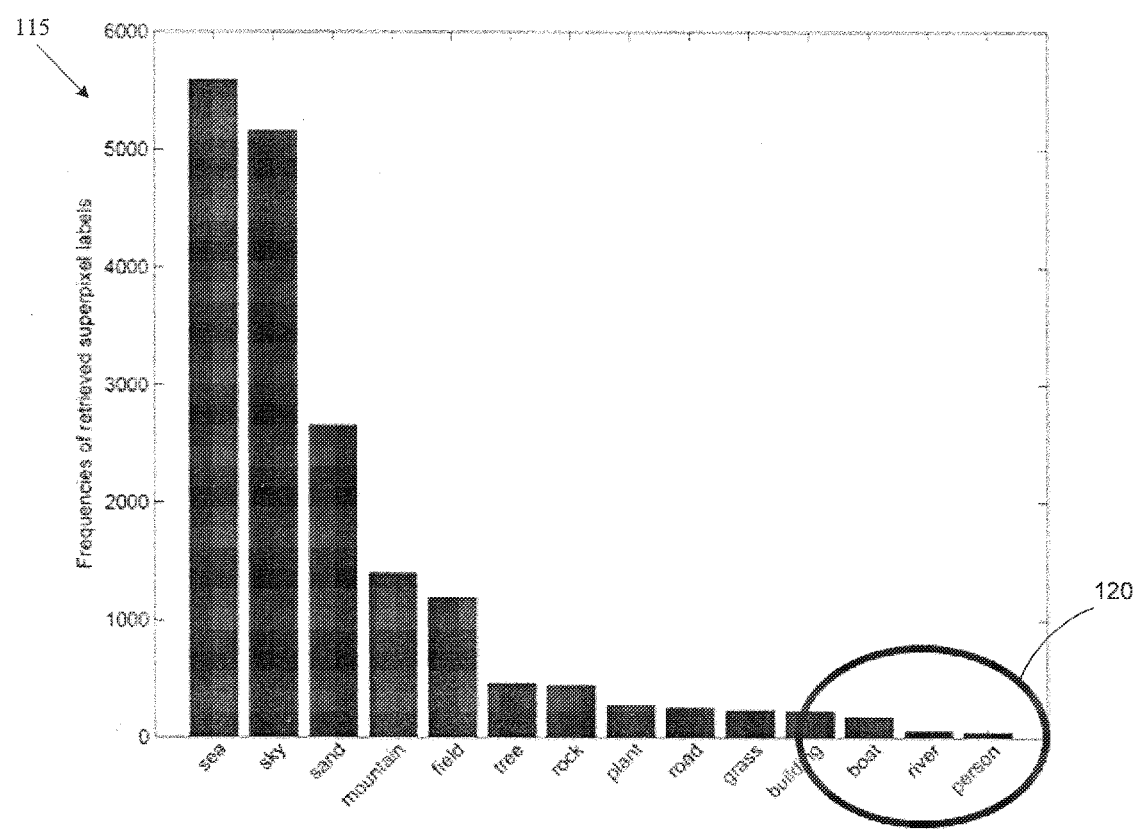
FIG. 7 illustrates label frequency.

FIG. 7 illustrates label frequency within a result set of reference images. In this example, in the selected reference images, superpixels with the label "sea" appear over 5000 times, superpixels with the label "sky" appear over 5000 times, superpixels with the label "sand" appear over 2000 times, etc. Note that some of the labels may be determined to be rare based on their frequencies of use. In this example, circle 120 identifies "boat," "river," and "person" as rare objects. Using a higher threshold, additional labels may also be identified as rare. For example, all labels with less than 2000 superpixels may be considered rare.

Figure 8:
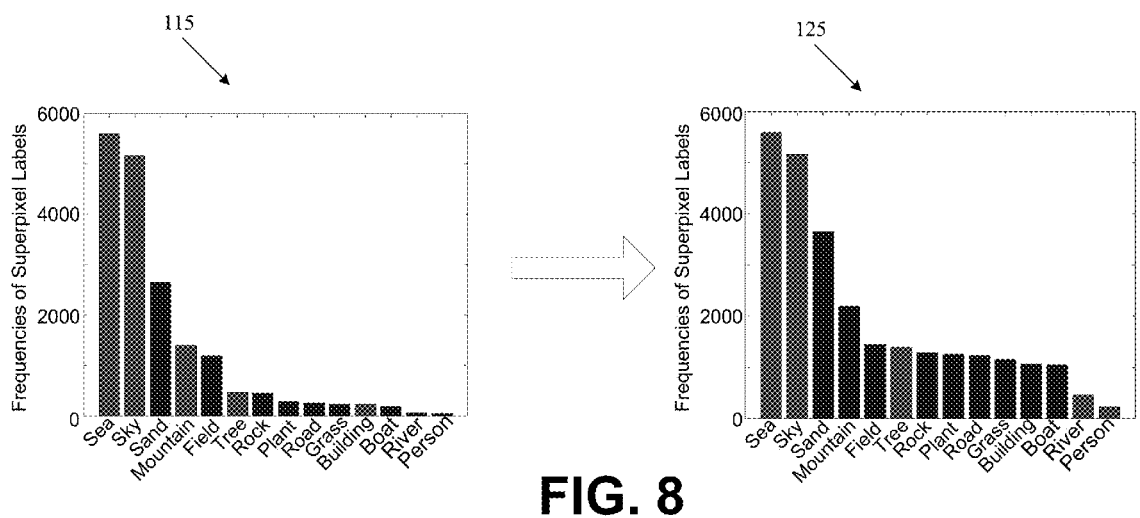
FIG. 8 illustrates how the label frequency depicted in FIG. 7 can be changed by supplementing with additional images.

In one embodiment, it is desirable to supplement the reference images selected to be used in a labeling process with additional superpixels. Doing so can provide additional examples of rare objects (e.g., people, dogs, or any other object having a relatively limited presence in the image library 66) so that instances of those rare objects will be better detected, and thus more accurately labeled, in the input image. This may involve determining a distribution of the object labels present in the selected reference images as is graphically depicted in FIG. 7. The distribution may be derived from the image metadata 68 for the reference images and indicate the portion of pixels of all the reference images that are allocated to each object label. For object labels having a proportion that fails to meet a predefined threshold, supplementary superpixels representing the "rare" object labels may be obtained, for example, from the image library 66. The number of supplementary superpixels obtained may be based on the predefined threshold and/or a supplement threshold, the number of supplementary superpixels available in the image library 66 for each rare object label, and/or other criteria as can be appreciated. FIG. 8 illustrates how the label frequency 115 can be changed by supplementing with additional superpixels to provide a label frequency 125 within an expanded result set having more rare object examples.

Once the reference images have been selected and possibly supplemented with additional superpixels, the superpixels of the input image 62 may be compared against the various superpixels present in the reference images and, potentially, the supplementary superpixels representing the rare objects (collectively, "comparison superpixels"). As a result, one or more potential labels for each superpixel of the input image 62 may be identified. The potential labels may each receive a score based on the comparisons, where the score represents how well the label describes the respective input image superpixel.

In one embodiment, superpixel comparisons involve comparisons of descriptors associated with or determined for each superpixel. In one illustrative embodiment, each superpixel may be represented by a descriptor representing four kinds of features: a SIFT histogram, an RGB histogram, a location histogram and a pyramid histogram of oriented gradients (PHOG). In this example, SIFT descriptors of four scales per 4 pixels may be extracted by using VLFeat package and encoded by 5 words from a vocabulary of size 1024 using the LLC algorithm and the resulting SIFT histogram is calculated by pooling in each superpixel region. In this illustrative embodiment, a 128-dimensional color histogram may be computed for each superpixel by quantizing the RGB features from a vocabulary of 128 color words, and a 36-dimensional location histogram by quantizing the (x, y) locations into a 6×6 grid. In addition, the 168-dimensional PHOG histogram may be extracted from the bounding box of each superpixel in a 1×1; 2×2; 4×4 pyramid. To incorporate the contextual features into the superpixel representation, the superpixel masks may be dilated by, for example, 10 pixels and may extract the same four kinds of features in the dilated superpixel regions. Thus, a 2712-dimensional ((1024+128 36+168)×2) feature vector $x_i$ may be obtained for each superpixel $s_i$.

In alternative embodiments, descriptors can represent fewer, more, and/or differing features. In general, descriptors provide information that allows one superpixel to be compared with another superpixel to determine how the superpixels are similar to one another with respect to one or more features. Such a comparison may result in a score. Thus, a comparison of an input image superpixel to a reference image superpixel may result in a score representing the similarity of those superpixels to one another. The label associated with the reference image superpixel can then be assigned that score, representing a measure of how accurate that label is as a label for the input image superpixel, i.e., how well it describes the input image superpixel. As a specific example, an input image superpixel of a tree may be compared to a reference image superpixel of a plant (labeled "plant") and to a reference image superpixel of a frog (labeled "frog"). The first comparison may yield a relatively high score for the "plant" label and the second comparison may yield a relatively low score for the "frog" label, the relative scores indicating that the "plant" label is a more accurate label for the input image superpixel than the "frog" label. Scores for many potential labels for the superpixel may be determined. Comparisons can involve multiple reference image superpixels for a given label. Comparisons can also involve the use of representative superpixel examples for a given label. Various techniques for comparing and/or scoring potential labels for an input image superpixel can be used and the particular technique used may be tailored to achieve accuracy, efficiency, storage size, and other system requirements.

Additionally, in some embodiments, a score may be adjusted based at least upon the spatial context of adjacent pixels in the input image 62. For example, the label receiving the highest score for a superpixel of the input image 62 may be associated with superpixels for a car. However, the image metadata 68 may indicate probabilities for different superpixel object labels being adjacent to a superpixel having the "car" object label. The superpixel of the input image 62 may have a superpixel of the "sky" above and superpixels of the "sea" below and to the sides. Given that, in this example, the image metadata 68 may indicate high improbability for having a superpixel of a car surrounded by sky and sea, the score for the "car" label for the superpixel of the input image 62 may be adjusted accordingly.

Once the comparisons with reference image superpixels has been performed to score potential labels, an appropriate object label can be assigned to one or more pixels of the input image 62. In one embodiment, each input image pixel is assigned a respective object label having the highest respective score. In another embodiment, the information from the comparisons is used with other information in selecting an appropriate label for each pixel. The assignment of object labels may be collected in the pixel map 64.

Once completed, the pixel map 64 may be provided as a response to a requesting computing device, such as the client device 54, via the network 56. In various embodiments, the pixel map 64 and potentially the input image 62 may be stored in the data store 58. In these embodiments, the input image 62 and the associated pixel map 64 may be added to the image library 66 and image metadata 68, respectively.

Rare Class Expansion

Figure 9:
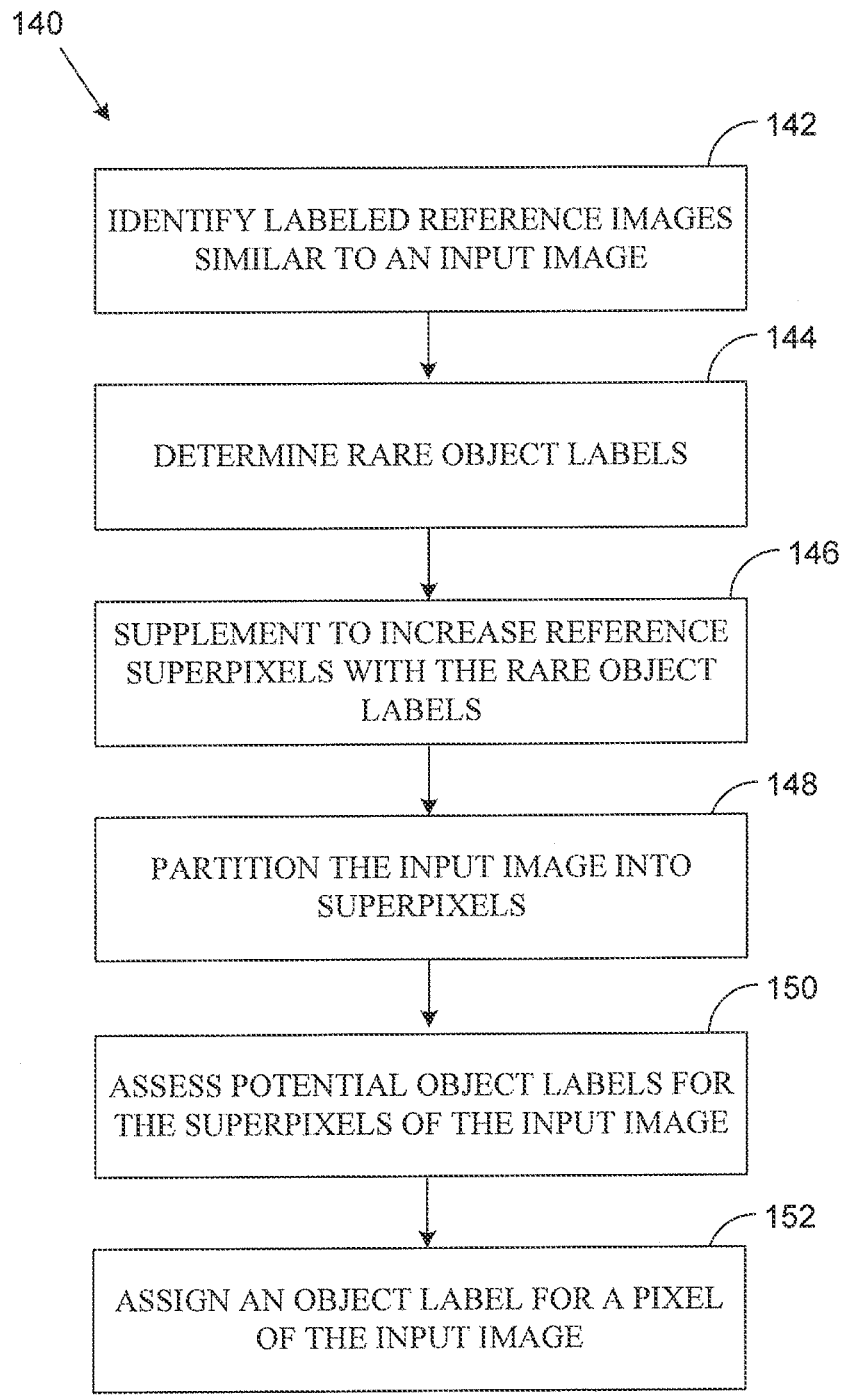
FIG. 9 illustrates a flow chart of an exemplary method of labeling objects based on expansion of reference data regarding rare classes.

FIG. 9 illustrates a flow chart of an exemplary method 300 of labeling objects based on expansion of reference data regarding rare classes. It is to be understood that the flowchart of FIG. 9 provides merely an example of the many different types of functional arrangements that may be employed to implement the operation of the portion of the object identification service 60 as described herein. As an alternative, the flowchart of FIG. 9 may be viewed as depicting an example of elements of a method implemented in the server device 52 (FIG. 3) according to one or more embodiments.

The method 140 begins by identifying labeled reference images similar to an input image, as shown in block 142. This may involve the object identification service 60 of FIG. 3, for example, searching the image library 66 to retrieve reference images that are similar to the input image 62, as well as potentially image metadata 68 for the reference images that may be obtained. Various techniques may be used to identify similar images. In one embodiment, spatially constrained image similarity $m(I_q, I_d)$ may be computed between the input image $I_q$ and reference images $I_d$, and retrieve top-K most similar reference images $\{I_d^1, I_d^2, \ldots, I_d^k\}$, where $m(I_q, I_d^k) > m(I_q, I_d^{k+1})$. Based on the Bag-of-Words image matching algorithm, the techniques in this illustrative embodiment may incorporate spatial voting of local features (scale-invariant feature transform (SIFT) and Red-Green-Blue (RGB) color) into image scoring. Therefore, the reference images often will have similar scene layout to the input image 62. As an example, a SIFT vocabulary of 10,000 words and a RUB color vocabulary of 1,000 words may be used for local feature quantization. The retrieval top-K images may also determine a subset of candidate object labels $L' \subset L$ fir the input image, where L is the overall label set.

The method 140 further involves determining rare object labels, as shown in block 144. Determining rare object labels may be based on a label distribution of the object labels in the labeled reference images or in the image dataset from which the labeled reference images are identified. For example, the object identification service 60 of FIG. 3 may determine a distribution of the object labels present. The distribution may be derived from the image metadata 68 for the reference images and indicates the portion of pixels of all the reference images, e.g., the image library 66, that are allocated to each object label. Object labels having a proportion that fails to meet a predefined threshold or any other suitable criteria or combination of criteria may be considered rare.

The method 140 further involves supplementing the identified labeled reference images with additional superpixels to increase reference superpixels with the rare object labels, as shown in block 146. Supplementary superpixels representing the "rare" object labels may be obtained from an image library 66 or any other suitable source. The number of supplementary superpixels obtained may be based on the predefined threshold and/or a supplement threshold, the number of supplementary superpixels available in the image library 66 for each rare object label, and/or other criteria as can be appreciated.

The method 140 further involves partitioning the input image into superpixels, as shown in block 148. This may involve a single set of superpixels or multiple sets of superpixels as described herein and may be accomplished by any suitable technique.

The method 140 further involves assessing potential object labels for the superpixels of the input image, as shown in block 150. This may involve comparing descriptors of the superpixels of the input image with descriptors of reference superpixels in the identified labeled reference images as described herein or may involve any other suitable technique for assessing potential object labels using the reference image superpixels.

A library may potentially have a large amount of superpixels of rare classes in total. To address this, only representative exemplars may be used for augmenting the retrieved superpixels. For each label, for example, at most 1000 exemplars may be selected using a kmeans algorithm. This can involve essentially projecting superpixel feature vectors into a low dimensional space and running kmeans to discover 1000 centers. The superpixels that are the most similar to those centers can then be selected as the representative exemplars of the particular labels.

The method 140 further involves assigning an object label for a pixel of the input image based at least in part on the assessing of the potential object labels, as shown in block 152. For example, if the potential object labels are scored, the label with the best score for each pixel can be selected.

Superpixel Classification and Pixel Scoring

Input image superpixels can be classified by using retrieved and augmented superpixel sets. A hybrid KNN-SVM classifier can be used for superpixel scoring. For the KNN component, the classification scores can be computed by $$S_{knn}(y_i = c \mid x_i) = \frac{\sum_{j \in knn(i), y_j = c} <\phi(x_i), \phi(x_j)>}{\sum_{j \in knn(i)} <\phi(x_i), \phi(x_j)>}.$$

For the SVM component, the SVM classifiers can be pre-trained for each class using the discovered exemplars, so that the SVM scores become:

$$S_{svm}(y_i = c \mid x_i) = <w_c, \phi(x_i)> + b_c.$$

Superpixel $s_i$ is a superpixel with label $y_i$ and descriptor $x_i$. The superpixel scores are given by the weighted summation of KNN and SVM scores:

$$S(y_i = c \mid x_i) = (1-\lambda)S_{svm}(y_i = c \mid x_i) + \lambda S_{knn}(y_i = c \mid x_i).$$

This can be done for each of multiple segmentations. For example, the images can be segmented into four scales such that each pixel is included in four superpixels. Therefore, each pixel p has four candidate scores per class, from which the maximum score can be chosen as the pixel classification score S(y_p=c). Consider, for example, a pixel p in the image to be segmented. The pixel will be in a superpixel from each of the four different segmentations. Therefore each pixel p will have four different potential scores S(y_{i1}|x_{i1}), S(y_{i2}|x_{i2}), S(y_{i3}|x_{i3}), S(y_{i4}|x_{i4}), where p is contained in four superpixels s_{i1}, s_{i2}, s_{i3}, s_{i4} from the four different segmentations. It may be desirable to assign a single score S(y_p=c) for labeling pixel p with class label c. To do so, in the circumstance in which S_{knn} is defined so that larger scores are preferred, the maximum of the four scores is selected. In other implementations, the smallest score may be selected.

Spatial Context Techniques

In some cases, due to retrieval noises and visual ambiguities, some semantic classes might be recognized in the wrong context. For example, a boat may be mistaken as a car in a beach image. To address this, spatial context may be incorporated into the superpixel scoring process. Generally, if the system knows that an area on top of one superpixel looks like sky while an area on bottom looks like sea, this superpixel will be less likely to be classified as a car. Spatial context can be accounted for using a spatial context descriptor as explained in the following exemplary, non-limiting example.

Figure 10:
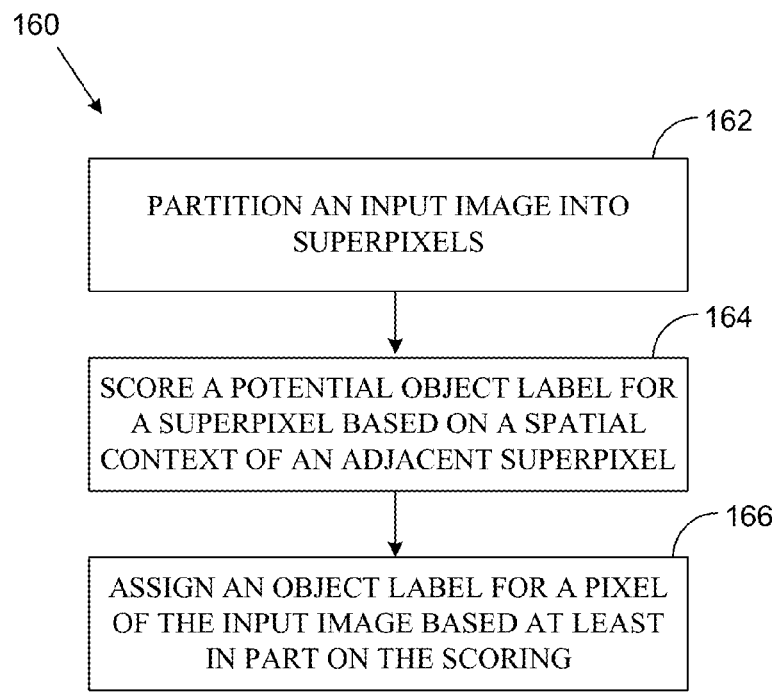
FIG. 10 illustrates a flow chart of an exemplary method of labeling objects using spatial context information.

FIG. 10 illustrates a flow chart of an exemplary method of labeling objects using spatial context information. It is to be understood that the flowchart of FIG. 10 provides merely an example of the many different types of functional arrangements that may be employed to implement the operation of the portion of the object identification service 60 as described herein. As an alternative, the flowchart of FIG. 10 may be viewed as depicting an example of elements of a method implemented in the server device 52 (FIG. 3) according to one or more embodiments.

The method 160 begins by partitioning an input image into superpixels, each of the superpixels comprising multiple pixels of the input image, as shown in block 162.

The method further involves scoring a potential object label for a superpixel of the superpixels based at least in part on a spatial context of an adjacent superpixel, as shown in block 164. The score may be based at least in part on the spatial context of an adjacent superpixel because the score is based on a likelihood of the adjacent pixel having a second potential object label. The scoring may involve comparing a descriptor of the superpixel with descriptors of reference superpixels in labeled reference images. In one embodiment scoring the potential object label involves determining an initial score by comparing the descriptor of the superpixel with descriptors of reference superpixels in the labeled reference images and adjusting the initial score based on the spatial context of the adjacent superpixel. For example, the label receiving the highest score may be "car." However, the associated image metadata may indicate probabilities for different superpixel object labels being adjacent to a superpixel having the "car" object label. The superpixel of the input image may have a superpixel of the sky above and superpixels of the sea below and to the sides. Given that, in this example, the image metadata may indicate high improbability for having a superpixel of a car surrounded by sky and/or sea, the score for the superpixel of the input image may be adjusted according to the probability.

Figure 11:
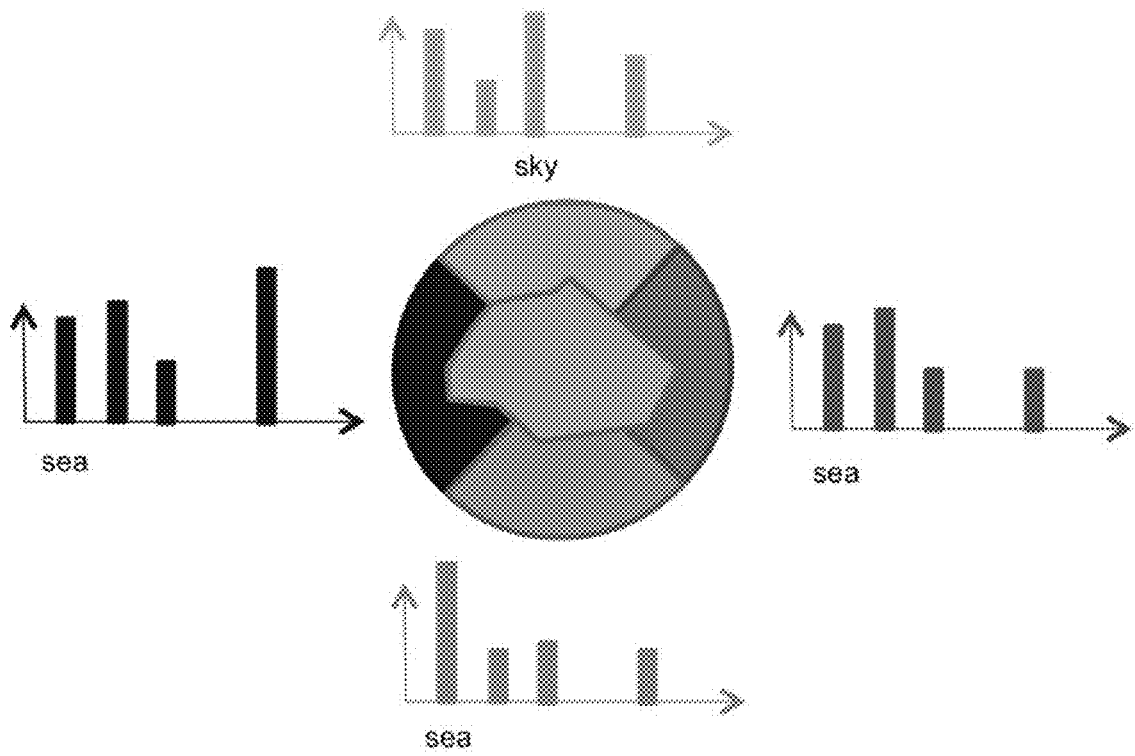
FIG. 11 illustrates computing a spatial context descriptor for one superpixel.

In one embodiment, the method 160 examines the classification likelihood in a 10-pixel neighborhood of each superpixel from previous classification likelihood maps. The neighbor is divided into left, right, top, bottom four cells as illustrated in FIG. 11. The class likelihood histogram per cell is calculated to form the spatial context descriptor. The spatial context descriptor can be combined with the superpixel descriptor to form a combined descriptor (also referred to as an extended descriptor) that is then used to score the object labels based on superpixel to superpixel comparisons.

An extended descriptor can be created by adding to the end of a descriptor for a superpixel to form the extended descriptor that accounts for spatial context. This can be accomplished by converting from costs without any spatial context to likelihoods/probabilities for labeling pixel p with class c, where high cost is low likelihood and vice-versa. This can be computed for each region. For example, for the left region for a superpixel, and for each class, the maximum likelihood of any pixel p in the left region is used to determine a likelihood for the area to the left of superpixel to have that class. A vector can created with values over all the classes. This can be repeated for the right, top, and bottom regions to provide four vectors, which can be combined into a single spatial context descriptor vector for the superpixel. This spatial context combine this spatial context descriptor vector to the original, "non-context" descriptor to form an extended descriptor for the superpixel that accounts for spatial context around the superpixel.

A spatial context descriptor can of course be determined using additional or alternative techniques and used with an original descriptor in alternative ways.

Returning to the blocks of FIG. 10, the method further involves assigning an object label for a pixel of the input image based at least in part on the scoring of the potential object label, as shown in block 166. The object label receiving the highest score may be the object label assigned to the pixel. The assignment of object labels may be collected in the pixel map 64.

Labeling

Labeling individual pixels can involve one or more of the multi-scale partitioning, rare class expansion, and spatial context techniques described herein. A four-connected pairwise MRF can be built for semantic labeling. The energy function is given by:

$$E(Y) = \sum_p E_{data}(y_p = c) + \sum_{pq} E_{smooth}(y_p = c, y_q = c').$$

The data energy per pixel is given by pixel scoring, $E_{data}(y_p=c)=\max(0,C-S'(y_p=c))$, where C is a constant value that defines the highest possible pixel scores. The smooth energy on edges is given by spatial variant label cost, $E_{smooth}(c,c')=-J(p,q)\cdot\log((P(c|c')+P(c'|c))/2)$, where $V(p,q)=\exp(-\|I(p)-I(q)\|^2/(2\sigma^2))$ and $(P(c'|c)+P(c'|c))/2$ are label co-occurrence statistics that are mined from the reference data. MRF inference may be performed by alpha-beta swap algorithm. More specifically, the V(p,q) part of the smoothness term encourages a change in labeling from one class to another to occur at an image edge by making the cost smaller as the colors of neighboring pixel become more different. The cost is also 0 when p and q are labeled with the same label c. The term −log [(P(c|c')+P(c'|c)/2], P(c|c') can be thought of as the probability that the label c is present in an image given that label c' is present in that image and can be derived from a labeled dataset. For example, this may involve counting the number of images N in which the label c' occurs and supposing that the label c occurs in M of those N images to identify that P(c|c')=M/N. The addition of P(c'c) can be used to make the expression symmetric in c and c' since only the co-occurrence of the labels may be of interest. The division by 2 keeps (P(c|c')+P(c'|c))/2 in the range [0,1] if the probabilities are in that range to begin with. The −log turns the probabilities into costs, where lower costs (higher probabilities) are better. This choice of −log keeps the costs non-negative. Note that P(c|c)=1, which would lead to a 0 cost−log [(P(c|c')+P(c'|c))/2] when c=c'.

General

Figure 12:
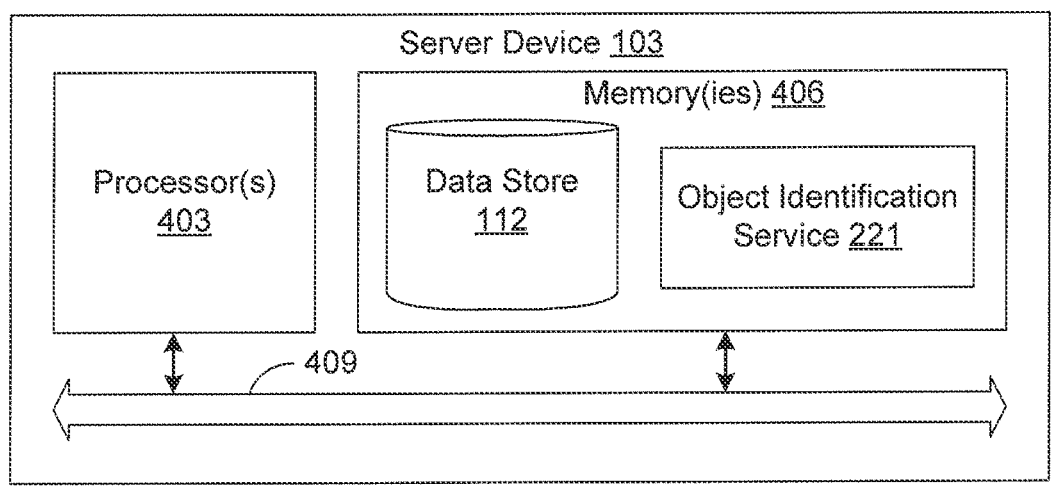
FIG. 12 is a schematic block diagram that provides one example illustration of a computing environment employed in the networked environment of FIG. 3 according to various embodiments of the present disclosure.

With reference to FIG. 12, shown is a schematic block diagram of the server device 52 according to an embodiment of the present disclosure. Each server device 52 includes at least one processor circuit, for example, having a processor 403 and a memory 406, both of which are coupled to a local interface 409. To this end, a server device 52 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the object identification service 60, and potentially other applications. Also stored in the memory 406 may be a data store 58 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the object identification service 60, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the object identification service 60. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts depicted herein show specific orders of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the object identification service 60, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the object identification service 60, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same server device 52, or in multiple computing devices in the same server device 52. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The above-described embodiments are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
partitioning an input image using different scale values to produce a different set of superpixels for each of the different scale values, each of the superpixels comprising a plurality of pixels of the input image, wherein a larger scale value produces a first set of superpixels with coarse superpixel regions and wherein a smaller scale value produces a second set of superpixels with finer superpixel regions compared to the first set of superpixel regions;
assessing potential object labels for superpixels in each different set of superpixels of the input image by comparing descriptors of the superpixels in each different set of superpixels of the input image with descriptors of reference superpixels in labeled reference images, wherein the reference superpixels are associated with respective object labels; and
assigning an object label for a pixel of the input image based at least in part on the assessing of the potential object labels,
the partitioning, assessing, and assigning performed by a processor of a computing device.

2. The method of claim 1, wherein assessing the potential object labels comprises using a classifying algorithm to score each of the potential object labels for superpixels in each of the different sets of superpixels.

3. The method of claim 1, wherein assessing the potential object labels comprises using a k-nearest neighbor (k-NN) classifying algorithm to score each of the potential object labels for superpixels in each of the different sets of superpixels.

4. The method of claim 1, wherein assessing the potential object labels comprises using a k-nearest neighbor (k-NN) classifying algorithm and a support vector machine (SVM) algorithm to score each of the potential object labels for superpixels in each of the different sets of superpixels.

5. The method of claim 1 wherein assigning the object label for the pixel of the input image comprises comparing, for each of the different sets of superpixels, potential object labels for superpixels corresponding to a location of the pixel in the input image.

6. The method of claim 1 further comprising assigning object labels for all pixels of the input image, wherein potential object labels for superpixels from each of the different sets of superpixels are assigned to different pixels of the input image.

7. The method of claim 1, wherein the descriptors comprise a scale-invariant feature transform (SIFT) histogram, a red green blue (RGB) histogram, a location histogram, and a pyramid histogram of oriented gradients (PHOG).

8. The method of claim 1, further comprising:
identifying the labeled reference images based on similarity to the input image, the labeled reference images identified from an image dataset;
determining rare object labels based on a label distribution of object labels in the image dataset; and
supplementing the identified labeled reference images with additional superpixels to increase reference superpixels with the rare object labels.

9. The method of claim 1, wherein assessing potential object labels comprises scoring a potential object label for a superpixel by comparing the descriptor of the superpixel with descriptors of reference superpixels in the labeled reference images, wherein the score is based at least in part on a spatial context of an adjacent superpixel.

10. The method of claim 1 further comprising:
identifying the labeled reference images based on similarity to the input image, the labeled reference images identified from an image dataset;
determining rare object labels based on a label distribution of object labels in the image dataset; and
supplementing the identified labeled reference images with additional superpixels to increase reference superpixels with the rare object labels,
wherein assessing potential object labels comprises scoring a potential object label for a superpixel by comparing the descriptor of the superpixel with descriptors of reference superpixels in the labeled reference images and the additional superpixels, wherein the score is based at least in part on a spatial context of an adjacent superpixel.

11. A system, comprising:
a processor; and a memory communicatively coupled to the processor, wherein the processor is configured to execute instructions included in the memory to perform operations comprising:

partitioning an input image using different scale values to produce a different set of superpixels for each of the different scale values, each of the superpixels comprising a plurality of pixels of the input image, wherein a larger scale value produces a first set of superpixels with coarse superpixel regions and wherein a smaller scale value produces a second set of superpixels with finer superpixel regions compared to the first set of superpixel regions;

assessing potential object labels for superpixels in each different set of superpixels of the input image by comparing descriptors of the superpixels in each different set of superpixels of the input image with descriptors of reference superpixels in labeled reference images, wherein the reference superpixels are associated with respective object labels; and assigning an object label for a pixel of the input image based at least in part on the assessing of the potential object labels.

12. The system of claim 11, wherein assessing the potential object labels comprises using a classifying algorithm to score each of the potential object labels for superpixels in each of the different sets of superpixels.

13. The system of claim 11, wherein assessing the potential object labels comprises using a k-nearest neighbor (k-NN) classifying algorithm to score each of the potential object labels for superpixels in each of the different sets of superpixels.

14. The system of claim 11, wherein the processor is configured to execute instructions included in the memory to perform operations further comprising:

identifying the labeled reference images based on similarity to the input image, the labeled reference images identified from an image dataset;

determining rare object labels based on a label distribution of object labels in the image dataset; and supplementing the identified labeled reference images with additional superpixels to increase reference superpixels with the rare object labels.

15. The system of claim 11, wherein assessing potential object labels comprises scoring a potential object label for a superpixel by comparing the descriptor of the superpixel with descriptors of reference superpixels in the labeled reference images, wherein the score is based at least in part on a spatial context of an adjacent superpixel.

16. A non-transitory computer-readable medium having stored thereon instructions for performing a method comprising machine executable code which when executed by at least one machine, causes the machine to:

partition an input image using different scale values to produce a different set of superpixels for each of the different scale values, each of the superpixels comprising a plurality of pixels of the input image, wherein a larger scale value produces a first set of superpixels with coarse superpixel regions and wherein a smaller scale value produces a second set of superpixels with finer superpixel regions compared to the first set of superpixel regions;

assess potential object labels for superpixels in each different set of superpixels of the input image by comparing descriptors of the superpixels in each different set of superpixels of the input image with descriptors of reference superpixels in labeled reference images, wherein the reference superpixels are associated with respective object labels; and assign an object label for a pixel of the input image based at least in part on the assessing of the potential object labels.

17. The non-transitory computer-readable medium of claim 16, wherein assessing the potential object labels comprises using a classifying algorithm to score each of the potential object labels for superpixels in each of the different sets of superpixels.

18. The non-transitory computer-readable medium of claim 16, wherein assessing the potential object labels comprises using a k-nearest neighbor (k-NN) classifying algorithm to score each of the potential object labels for superpixels in each of the different sets of superpixels.

19. The non-transitory computer-readable medium of claim 16, wherein the machine executable code further causes the machine to:

identify the labeled reference images based on similarity to the input image, the labeled reference images identified from an image dataset;

determine rare object labels based on a label distribution of object labels in the image dataset; and supplement the identified labeled reference images with additional superpixels to increase reference superpixels with the rare object labels.

20. The non-transitory computer-readable medium of claim 16, wherein assessing potential object labels comprises scoring a potential object label for a superpixel by comparing the descriptor of the superpixel with descriptors of reference superpixels in the labeled reference images, wherein the score is based at least in part on a spatial context of an adjacent superpixel.

* * * * *